(12) United States Patent
Brown

(10) Patent No.: US 7,890,296 B2
(45) Date of Patent: Feb. 15, 2011

(54) METHOD OF ANALYZING THE PERFORMANCE OF GAS TURBINE ENGINES

(75) Inventor: Stephen G. Brown, Derby (GB)

(73) Assignee: Rolls-Royce PLC, London (GB)

( * ) Notice: Subject to any disclaimer, the term of this patent is extended or adjusted under 35 U.S.C. 154(b) by 415 days.

(21) Appl. No.: 11/887,618

(22) PCT Filed: Apr. 13, 2006

(86) PCT No.: PCT/GB2006/001363
§ 371 (c)(1),
(2), (4) Date: Nov. 30, 2007

(87) PCT Pub. No.: WO2006/123090
PCT Pub. Date: Nov. 23, 2006

(65) Prior Publication Data
US 2009/0271149 A1 Oct. 29, 2009

(30) Foreign Application Priority Data
May 14, 2005 (GB) .................................. 0509898.3

(51) Int. Cl.
G06F 17/40 (2006.01)
G06F 11/00 (2006.01)
(52) U.S. Cl. ..................... 702/182; 702/105; 702/113; 702/183; 700/28; 701/100
(58) Field of Classification Search .............. 702/182, 702/105, 198, 113–115, 183
See application file for complete search history.

(56) References Cited
U.S. PATENT DOCUMENTS
5,265,028 A * 11/1993 Machala, III ................ 703/2

5,422,925 A * 6/1995 Komatsu et al. .............. 378/45

(Continued)

FOREIGN PATENT DOCUMENTS
EP 0 315 307 5/1989

(Continued)

OTHER PUBLICATIONS

Abur, A., et al., "Topology Error Identification by Least Absolute Value State Estimation," Apr. 12, 1994, pp. 972-975.

(Continued)

*Primary Examiner*—Hal D Wachsman
(74) *Attorney, Agent, or Firm*—Oliff & Berridge, PLC

(57) ABSTRACT

A method of analysing measured data from a system having multiple associated system variables, the method including the steps of: a) optimizing an error function relating the measured data to a predetermined number of the system variables to adjust the system variables; b) selecting a subset of the adjusted variables; and c) re-optimizing the error function by adjusting only the variables in the subset. A method of identifying likely contributors to an error caused in measured data from a system which has multiple associated system variables. A method of analysing measured engine service or test data form an engine having a plurality of associated system variables, includes the step of optimizing an error function which relates the measured data to a predetermined number of the system variables, by least-absolutes optimization wherein the error function is a sum of absolute variations.

18 Claims, 5 Drawing Sheets

U.S. PATENT DOCUMENTS

| | | | |
|---|---|---|---|
| 5,933,345 A * | 8/1999 | Martin et al. | 700/44 |
| 6,278,962 B1 | 8/2001 | Klimasauskas et al. | |
| 6,606,580 B1 * | 8/2003 | Zedda et al. | 702/185 |
| 6,904,328 B2 * | 6/2005 | Rietman et al. | 700/97 |
| 2004/0015460 A1 * | 1/2004 | Alhadef et al. | 706/16 |

FOREIGN PATENT DOCUMENTS

| | | |
|---|---|---|
| EP | 0 315 307 A2 | 5/1989 |
| GB | 2 211 965 A | 7/1989 |

OTHER PUBLICATIONS

European Search Report in European Application No. EP 10 16 4972, dated Nov. 22, 2010.

* cited by examiner

Fig.1.

| Parameter | Normalisation | Function ty | PCNL | PCNI | P30 | T30 | P50 | P140 |
|---|---|---|---|---|---|---|---|---|
| B140Q | 0.1 | 0 | 2.148% | 0.117% | 1.542% | 0.405% | 0.943% | -0.991% |
| B15215Q | 0.1 | 0 | -0.097% | 0.570% | -0.362% | 0.600% | -0.171% | 0.062% |
| B1844Q | 0.1 | 0 | -0.030% | 0.140% | -0.489% | -0.019% | 0.226% | -0.082% |
| B180VBQ | 0.1 | 0 | -0.141% | 0.267% | -0.038% | 0.126% | 0.001% | -0.003% |
| B18130Q | 0.1 | 0 | -0.119% | 0.239% | -0.293% | 0.067% | -0.143% | 0.056% |
| BH3415Q | 0.1 | 0 | -0.017% | -0.054% | -1.023% | -0.344% | -0.030% | 0.011% |
| BH342Q | 0.1 | 0 | -0.036% | -0.124% | -1.047% | -0.195% | -0.065% | 0.023% |
| BH6455Q | 0.1 | 0 | -0.187% | 0.060% | -0.546% | -0.090% | 0.467% | -0.170% |
| B3040Q | 0.1 | 0 | 0.000% | 0.000% | 0.000% | 0.000% | -0.001% | 0.000% |
| B30405Q | 0.1 | 0 | -0.001% | -0.002% | -0.052% | -0.016% | -0.001% | 0.000% |
| B30415Q | 0.1 | 0 | -0.002% | -0.007% | -0.063% | -0.026% | -0.004% | 0.001% |
| 10"AB140 | 0.1 | 0 | 0.222% | 0.027% | 0.205% | 0.058% | 0.126% | -0.046% |
| ZER M1A | 0.1 | 0 | -1.064% | -0.192% | -1.173% | -0.346% | -0.718% | 0.262% |
| FAN ETA | 0.1 | 0 | 0.077% | -0.123% | -0.372% | -0.125% | -0.231% | 0.084% |
| LPC ETA | 0.1 | 0 | 0.025% | -0.136% | 0.089% | -0.150% | 0.044% | -0.016% |
| DPPESS | 0.1 | 0 | -0.052% | 0.293% | -0.191% | 0.325% | -0.094% | 0.034% |
| DPPCMB | 0.1 | 0 | -0.033% | -0.106% | 0.851% | 0.109% | -0.060% | 0.022% |
| DPPTBH | 0.1 | 0 | -0.069% | 0.086% | 0.255% | 0.095% | 1.257% | -0.089% |
| DPPOGV | 0.1 | 0 | -0.109% | 0.212% | 0.603% | 0.218% | 0.376% | -0.138% |
| H NOZA | 0.1 | 0 | 0.134% | -0.021% | -0.009% | -0.012% | -0.678% | 0.113% |
| C NOZA | 0.1 | 0 | 0.584% | -0.050% | 0.125% | -0.018% | 0.029% | -0.562% |
| 1% ZSH | 0.1 | 0 | -0.115% | -0.021% | 0.000% | 0.024% | 0.000% | 0.000% |
| 1% FLOAD | 0.1 | 0 | -0.688% | -0.240% | -1.137% | -0.351% | -0.767% | -0.425% |
| 1% ZPS9A | 0.1 | 0 | 0.890% | 0.307% | 0.220% | 0.405% | -0.219% | -0.543% |
| 1% ZTO | 0.1 | 0 | -0.480% | -0.492% | 0.046% | -0.906% | -0.026% | -0.011% |
| 1% ZP135 | 0.1 | 0 | 0.000% | 0.000% | 0.000% | 0.000% | 0.000% | 1.000% |
| 1% ZP01 | 0.1 | 0 | -0.231% | -0.022% | -0.113% | -0.020% | -0.013% | 0.008% |
| 1% ZTS30 | 0.1 | 0 | 0.000% | 0.000% | 0.000% | 0.000% | 0.000% | 0.000% |
| 1% ZT25 | 0.1 | 0 | 0.000% | 0.000% | 0.000% | 0.000% | 0.000% | 0.000% |
| 1% ZP25 | 0.1 | 0 | 0.000% | 0.000% | 0.000% | 0.000% | 0.000% | 0.000% |
| 1% ZPS30 | 0.1 | 0 | 0.000% | 0.000% | 0.000% | 0.000% | 0.000% | 0.000% |
| 1% ZNH | 0.1 | 0 | 0.000% | 0.000% | 0.000% | 0.000% | 0.000% | 0.000% |
| 1% TIMEB | 0.1 | 0 | 0.000% | 0.000% | 0.000% | 0.000% | 0.000% | 0.000% |
| Matching values | | | 0.500% | 0.000% | 0.700% | 1.100% | 0.160% | -0.200% |
| Normalisation values | | | 0.001 | 0.001 | 0.001 | 0.001 | 0.001 | 0.001 |
| Function Type | | | 2 | 2 | 2 | 2 | 2 | 2 |
| Correction value assignment | | | 1 | 1 | 1 | 1 | 1 | 1 |
| | | | PCNL | PCNI | P30 | T30 | P50 | P140 | bleeds = 12
components = 9
measurements = 12

METHOD OF ANALYZING THE PERFORMANCE OF GAS TURBINE ENGINES

This is a National Phase Application of Application No. PCT/GB2006/001363 filed Apr. 13, 2006. The disclosure of the prior application is hereby incorporated by reference herein in its entirety.

BACKGROUND

The present invention relates to methods of analysis. It is particularly, but not exclusively, concerned with methods of analysing test and/or service data, and more particularly such data from engines.

Analysis of the performance of gas turbine engines is important for both testing of development engines and condition monitoring of operating engines. In particular, the ability to identify accurately and reliably the component or components responsible for a loss of performance is beneficial. However, the nature of a gas turbine means there are inherent problems to be addressed if this is to be achieved in practice.

In common with other power plant, a gas turbine's performance can be expressed in terms of a series of performance parameters for the various components of the system. Typically, those chosen to characterise the performance of a gas turbine would be the efficiency and flow function of compressors and turbines and the discharge coefficient of nozzles. Significantly, these performance parameters are not directly measurable. They are, however, related to measurable engine parameters, such as spool speeds, averaged pressures and temperatures, thrust and air flows, and any loss in performance of a component will be reflected by changes in these measurable parameters.

Given a particular operating point, typically defined by environmental conditions and a power setting (inlet temperature and pressure, and fuel flow for example, or other such operating parameters), the relationship between measured engine parameters and performance parameters can be represented, for example, in a performance simulation model describing the aerothermodynamics of the gas turbine's components. In principle this enables the performance parameters, and more importantly changes in them from respective reference values, to be calculated. In turn, it should be possible, from these calculated values, to detect a drop in the performance of one or more components and hence deduce the cause of a loss in performance. This can be achieved using thermodynamic or synthesis models or by use of exchange rate models. Exchange rate models provide a linear relationship between performance and measurable engine parameters which is valid for small variations around the chosen operating point.

A number of methods exist for the understanding of engine test data produced from steady state engine analysis. The most basic of these uses measured engine parameters to calculate component thermodynamic efficiencies (actual gas temperature ratio across the component, relative to the ideal temperature ratio for the given pressure ratio). This provides component data at the conditions under which the test is run, but does not provide data which can be scaled or synthesised to other conditions. Additional parameters such as air flows and pressures and temperatures not measured directly (e.g. turbine entry temperature (TET): the gas temperature at the entry to the first (high pressure) turbine rotor blade, which is too hot to measure directly) may be calculated using further assumptions.

More rigorous analysis is possible using a tool known as ANSYN ("Analysis/Synthesis") produced by Rolls-Royce. This uses a thermodynamic or synthesis model of the engine and thereby derives the scaling of characteristics etc. to match the measured data. This tool uses an iterative solution matching process whereby the user selects a number of parameters (e.g. efficiencies, flow capacities) that will be changed so as to match the measured data. An exact solution can therefore be obtained which can then be used to tune the model.

However, in the ANSYN tool, the number of variables must be equal to the number of measurements, as otherwise an exact solution cannot be obtained. Furthermore, this method can only provide a solution for those variables which are selected by the user and cannot analyse errors arising due to instrument inaccuracy or due to engine faults or divergences not covered by the selected variables (e.g. air system leakages).

For fault analysis, a program called AJA3 produced by Rolls-Royce is available. This program takes chosen parameters in turn and uses a least squares optimisation process and exchange rates to achieve a best match to the measured data. The parameter or parameters that give the best fit are then listed. This program can therefore be used to try to identify the causes of faults, but is time consuming to set up and has not been greatly used.

Other techniques for analysing test data have been studied recently. In particular, as described in U.S. Pat. No. 6,606,580 a genetic algorithm has been evaluated for solving least absolute error functions in an attempt to identify fault causes. The genetic algorithm makes use of a computer synthesis model and a number of variables to find a best fit to the measured data. The genetic algorithm itself is an iterative process that considers a large number of potential solutions at each iteration. From these solutions, the best are selected and developed into another set of possible solutions and the process repeated. This method permits the evaluation of instrumentation errors and is not limited in terms of the number of variables equalling the number of measurements. However, this process is very demanding in terms of the computing power and runs can take up to 12 hours to complete. It is also time consuming to set up.

Another tool available and used in engine trend monitoring is the module performance analysis (MPA) tool which forms part of "COMPASS"/VQ48 software produced by Rolls-Royce and discussed in GB 2,211,965. This uses a Kalman filter with a least squares optimisation scheme. The analysis is carried out using exchange rates rather than a synthesis model. The use of exchange rates can greatly simplify the analysis of engine data since the complicated thermodynamic relationships of a synthesis model are replaced by linear relationships between all of the parameters. Although exchange rate models are generally only applicable in situations where the values of the parameters change by small percentages (e.g. 3-4%), this is usually sufficient for this type of analysis.

This process permits measurement errors and component differences to be assessed. The assumption is made that measurement errors and component differences can be considered as statistical; that is, they are known with a particular uncertainty. More specifically, an optimisation can be carried out on the following function:

$$\sum_{i=1}^{n}|Var(i)/VNorm(i)|^2 + \sum_{j=1}^{m}|(Mcal(j)-M(j))/MNorm(j)|^2$$

where:

Var(i) is the value of the ith variable; VNorm(i) is the normalisation value of the ith variable (if zero this variable is excluded from the error function); n is the number of variables; Mcal(j) is the matching value calculated from the exchange rates and the variable values for the jth matching quantity:

$$Mcal(j) = \sum_{i=1}^{n} Var(i) \times Xrate(i,j)$$

where Xrate(i,j) is the exchange rate in the jth matching value with respect to the ith variable; M(j) is the measured value for the jth matching parameter; MNorm(j) is the normalisation value of the jth matching value (if this is zero, this matching value is not included in the error function; and Ef(j) is the error function type for the jth matching value with the same restrictions as Ef(i).

The solution that will minimise the amount of the error implied in the measurements and component changes is obtained. Further filtering may then be carried out which sets those errors that are smallest to be equal to zero and so concentrate the errors on fewer measurements and/or components. However, the use of the least squares optimisation results in the changes being shared across a large number of variables, resulting in both a reduction in the apparent magnitude of the correct parameters and "smearing" into parameters that should not have been affected. Additionally, the least squares approach is not statistically valid in the case where a fault exists (and under such circumstances this process will often fail completely). This is due to the statistical assumption that there is a normal distribution centred about the expected value. An error (such as that caused by a broken pipe or wire) will form a different statistic to that assumed to be due to random scatter (i.e. measurement accuracy).

SUMMARY

Therefore the present invention seeks to provide methods for analysing data which overcome some or all of the disadvantages discussed in relation to the above methods and processes.

A first aspect of the present invention provides a method of analysing measured data, in relation to expected data, from a system which has a plurality of associated system variables, the method including the steps of:

a) optimising an error function 101 which relates the measured data to a predetermined number of the system variables adjusting the system variables (Step 1);

b) selecting a subset of the adjusted variables which excludes one or more of those variables which contribute most to the error function 101 in its optimised form (Step 2); and c) optimising a further error function 102 which does not contain variables outside the subset (Step 3).

The further error function preferably contains the variables in the first subset along with measured data.

Steps b) and c) may be performed iteratively a plurality of times.

The method may include a predetermined number of such iterations, or may continue until the number of variables selected in step b) is equal to or fewer than a predetermined number.

By considering the results of several iterations in the above method, a user may also be able to observe how different components of the system under analysis are potentially responsible for the measured data.

By using a method according to this aspect of the present invention, a user may be able to identify more readily a potential cause of changes from the norm in the measured data. In particular, a user may be able to determine from analysis of the results of optimisations with and without a particular contributing variable how that variable is related to an observed performance change in the measured data.

By considering the results of optimisations without the contribution of one or more significant variables, the effect or contribution of other variables to the measured data may be more accurately determined or analysed.

Preferably the number of variables in the or each subset selected is predetermined or is a predetermined fraction of the number of variables used in the previous optimisation. These numbers and/or fractions may be user defined in advance of carrying out the method, or may be selected between each optimisation.

Where the method involves iteration, a combination of selecting predetermined numbers of variables and predetermined fractions of variables may be used.

Where a fraction of the number of variables used in the previous optimisation is selected, the fraction may be the same for each iteration, or may vary between iterations, for example according to a predetermined pattern.

Preferably the method also includes the step of displaying the results of one or more of the optimising steps, and more preferably includes the displaying of the results of all of the optimising steps. Where the method includes iteration, the step of displaying may be included as part of the iterative process, or may be a separate step performed after all optimisation steps have been completed.

The results may be displayed as data or graphically in charts or graphs. The step of displaying may include displaying the result of a plurality of optimising steps together to allow comparative analysis.

A second aspect of the present invention provides a method of identifying likely contributors to an error cause in measured data from a system which has a plurality of associated system variables, the method including the steps of:

a) optimising an error function 101 which relates the measured data to a predetermined number of the system variables adjusting the system variables (Step R1;

b) selecting a subset of the adjusted variables which contains those variables which contribute most to the error function 101 in its optimised form (Step R2); and c) analysing all possible combinations 103 of a predetermined number of the variables of the subset, to determine the combination which makes the greatest contribution to the optimised error function (Step R3).

The so-called "searching" method of step c) can then be used to identify a probable error cause.

By selecting a subset of the variables prior to analysing the possible combinations, the number of possible combinations which are analysed in the above method can be significantly reduced compared to carrying out the analysing step alone.

This can result in a corresponding reduction in the amount of computing resources (e.g. either power or time) required to carry out the above searching method. Alternatively, the predetermined number of variables in each combination can be increased without a corresponding increase in the amount of computing resources used, and the accuracy of the result obtained may thus be improved.

A third aspect of the present invention provides a method of identifying likely contributors to an error cause in measured data from a system which has a plurality of associated system variables, the method including the steps of:

a) optimising an error function 101 which relates the measured data to a predetermined number of the system variables by adjusting the system variables (Step P1);

b) selecting a first subset of the adjusted variables which contains a plurality of those variables which contribute most to the error function 101 in its optimised form (Step P2);

c) optimising a further error function 102, which does not contain variables outside the first subset, by adjusting the variables in the first subset (Step P3);

d) selecting a second subset of the adjusted variables which contains those variables which contribute most to the further error function 102 in its optimised form (Step P4); and e) analysing all possible combinations 103 of a predetermined number of the variables of the selection, to determine the combination which makes the greatest contribution to the optimised further error function 102 (Step P5).

Steps b) and c) of this aspect may be repeated prior to selecting the adjusted variables in step d). In this repetition, any of the methods discussed above in relation to iteration of the first aspect may be used.

The method of this aspect can reduce even further the number of possible combinations which are to be analysed in the final step, thus further saving on computing resources.

The further error function of this aspect preferably contains the variables in the first subset along with measured data.

The method of any of the above aspects may also include the step of measuring the system, or an output from the system, to obtain the measured data.

Preferably the error function used in any of the above aspects of the present invention is a sum of squared variations or errors and the or each step of optimisation includes a least-squares optimisation. More preferably the error function used in either of the above aspects is of the form:

$$\Sigma(\text{measurement\_error/uncertainty})^2 + \Sigma((\text{Calc\_change} - \text{component\_change})/\text{uncertainty})^2$$

In particular the error function used in either of the above aspects may be of the form:

$$\sum_{i=1}^{n} |Var(i)/VNorm(i)|^{Ef(i)} + \sum_{j=1}^{m} |(Mcal(j) - M(j))/MNorm(j)|^{Ef(j)}$$

where:

Var(i) is the value of the ith variable; VNorm(i) is the normalisation value of the ith variable (if zero this variable is excluded from the error function); Ef(i) is the error function type for the ith variable (which must take a value of 0 or 2); n is the number of variables; Mcal(j) is the matching value calculated from the exchange rates and the variable values for the jth matching quantity:

$$Mcal(j) = \sum_{i=1}^{n} Var(i) \times Xrate(i, j)$$

where Xrate(i,j) is the exchange rate in the jth matching value with respect to the ith variable; M(j) is the measured value for the jth matching parameter; MNorm(j) is the normalisation value of the jth matching value (if this is zero, this matching value is not included in the error function; and Ef(j) is the error function type for the jth matching value with the same restrictions as Ef(i).

The methods of the above aspects can provide solutions for all possible variables that may contribute to the measured data and not only those which are selected by the user, and can thus analyse errors arising due to instrument inaccuracy or engine faults or divergences which might not have been covered by user selected variables (e.g. air system leakages).

Whilst the methods of the above aspects may be used in the analysis of any form of measured data, they are particularly useful in the analysis of a steady state situation.

The methods of the above aspects find particular applications in the fields of analysing data from engines, and especially gas turbine engines.

A fourth aspect of the present invention provides a method of analysing measured engine service or test data in relation to expected data, including the step of optimising an error function which relates the measured data to a predetermined number of system variables associated with the engine by adjusting the system variables, wherein the error function is a sum of absolute variations 105 and the step of optimising includes a least-absolutes optimisation (Step Q1).

A typical error function of this aspect is of the form:

$$\Sigma |\text{measurement\_error/uncertainty}| +$$

$$\Sigma |(\text{Calc\_change} - \text{component\_change})/\text{uncertainty}|$$

and more particularly may take the form:

$$\sum_{i=1}^{n} |Var(i)/VNorm(i)|^{Ef(i)} + \sum_{j=1}^{m} |(Mcal(j) - M(j))/MNorm(j)|^{Ef(j)}$$

where:

Var(i) is the value of the ith variable; VNorm(i) is the normalisation value of the ith variable (if zero this variable is excluded from the error function); Ef(i) is the error function type for the ith variable (which must take a value of 0 or 1); n is the number of variables; Mcal(j) is the matching value calculated from the exchange rates and the variable values for the jth matching quantity:

$$Mcal(j) = \sum_{i=1}^{n} Var(i) \times Xrate(i, j)$$

where Xrate(i,j) is the exchange rate in the jth matching value with respect to the ith variable; M(j) is the measured value for the jth matching parameter; MNorm(j) is the normalisation value of the jth matching value (if this is zero, this matching value is not included in the error function; and Ef(j) is the error function type for the jth matching value with the same restrictions as Ef(i). By optimising a "least absolutes" error function, the number of variables in the solution which contribute to the error (i.e. the number of variables which have non-zero values in the solution) can be restricted to the number of measurements taken. Thus by optimising an error function of this form a solution can be obtained that minimises the error by concentrating on a limited sub-set of possible measurement or component differences. Thus this method can provide a very effective form of "concentrator" which permits the analysis of the combined effects of, for example, component deterioration, component faults and measurement faults.

Preferably, the step of optimising includes the sub-steps of:

a) determining the system variable whose variation will contribute most to optimising the error function;

b) optimising the error function by changing only that system variable; and c) repeating steps a) and b) for further system variables until the solution converges and no further optimisation is possible.

This solution method is based on the Simplex method of linear analysis.

The method may further include the step of measuring the system, or an output from the system, to obtain the measured data.

In particular embodiments of this aspect, the engine is a gas turbine engine.

A method of this aspect, when implemented on a standard general purpose computer can allow tens of points (each point being a set of measurements for which the analysis is performed) per second to be analysed on a standard personal computer, which represents a significant increase in the speed of operation compared to the genetic algorithm process described above.

The method of the present aspect may be used as part of other methods of analysis, with the attendant advantages in speed of execution and in concentration of the solution conferring similar advantages on these methods.

For example, the method of the present aspect may be used in a method of monitoring changes in engine performance over time, for example due to component deterioration. Alternatively, the method of the present aspect may be used in methods of fault diagnosis, allowing engine faults to be quickly identified and rectified. Alternatively the method of the present aspect may be used in methods of identifying mechanical faults, such as those which cause a change in engine performance. This may allow corrective action to be taken before more serious secondary failures occur.

The method of the present aspect may be used in monitoring and/or analysing engine service data on engines which are installed for commercial use and are operational as well as those which are being run on a test bed.

When the method of any of the above aspects is applied to an engine, the system variables preferably include performance parameters of the engine.

Whatever system the method of any of the above aspects is applied to, the system variables preferably include measurement errors.

All of the above aspects of the present invention may use models of system performance in the steps of optimisation. Particularly when used in relation to analysis of engine data, the models of system performance may be thermodynamic models, but are preferably exchange rate models. The use of exchange rate models can greatly simplify the number of calculations carried out during any optimisation step.

Use of exchange rate models allows the underlying thermodynamic model to only be run once, during the calculation of the exchange rate model. Since running of the thermodynamic model is very demanding on computational resources, use of exchange rates can result in methods which are both quicker and use fewer resources.

Use of the exchange rate model can cause the functions involved to be linearised, which avoids the need for an iterative approach to optimisation or solving (and thus a need to run the thermodynamic model a plurality of times).

When exchange rates are used in combination with a least-squares function, the resulting function can be solved using simultaneous linear equations which can be readily solved. Similarly when exchange rates are used in combination with a least-absolutes function, the resulting function can be solved using the modified simplex method. Iterative approaches to optimising or solving can lead to failures to find a solution, so the use of exchange rates may also reduce or eliminate such failures, thus providing a more robust method.

Further aspects of the invention provide: computer-readable code for performing the method of any of the previous aspects; a computer program product carrying such computer-readable code; and a computer system configured to perform the method of any of the previous aspects.

A typical computer system of the present invention includes a central processing unit (CPU), input means, output means and data storage means (such as RAM). A monitor may be provided for display purposes.

The term "computer program product" includes any computer readable medium or media which can be read and accessed directly by a computer. Typical media include, but are not limited to: magnetic storage media such as floppy discs, hard disc storage medium and magnetic tape; optical storage media such as optical discs or CD-ROM; electrical storage media such as RAM and ROM; and hybrids of these categories such as magnetic/optical storage media.

For example, a computer system according to the invention may include a processor adapted to optimise an error function and to select subsets of variables depending on their contribution to the error function.

The computer system may further comprise a memory device for storing measurement data which is used in forming the error function. Solution(s) to the optimisation(s) may be stored on another or the same memory device, and/or may be sent to an output device or displayed on a monitor.

BRIEF DESCRIPTION OF THE DRAWINGS

FIG. 1 is an example of an input worksheet.

DETAILED DESCRIPTION OF THE EMBODIMENTS

Figure 2:
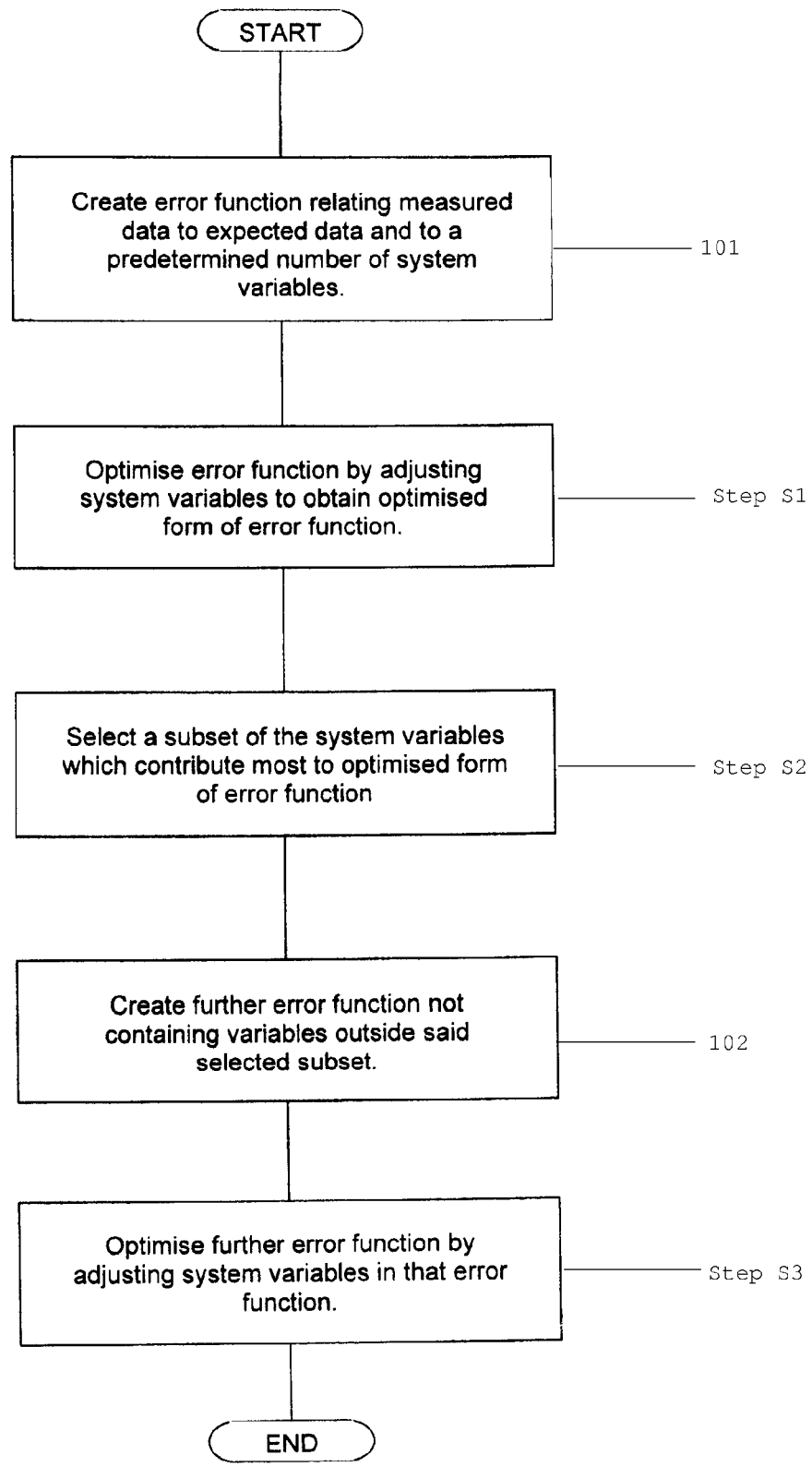
FIG. 2 diagrams a method for analyzing measured data in relation to expected data and optimizing error function.
Figure 3:
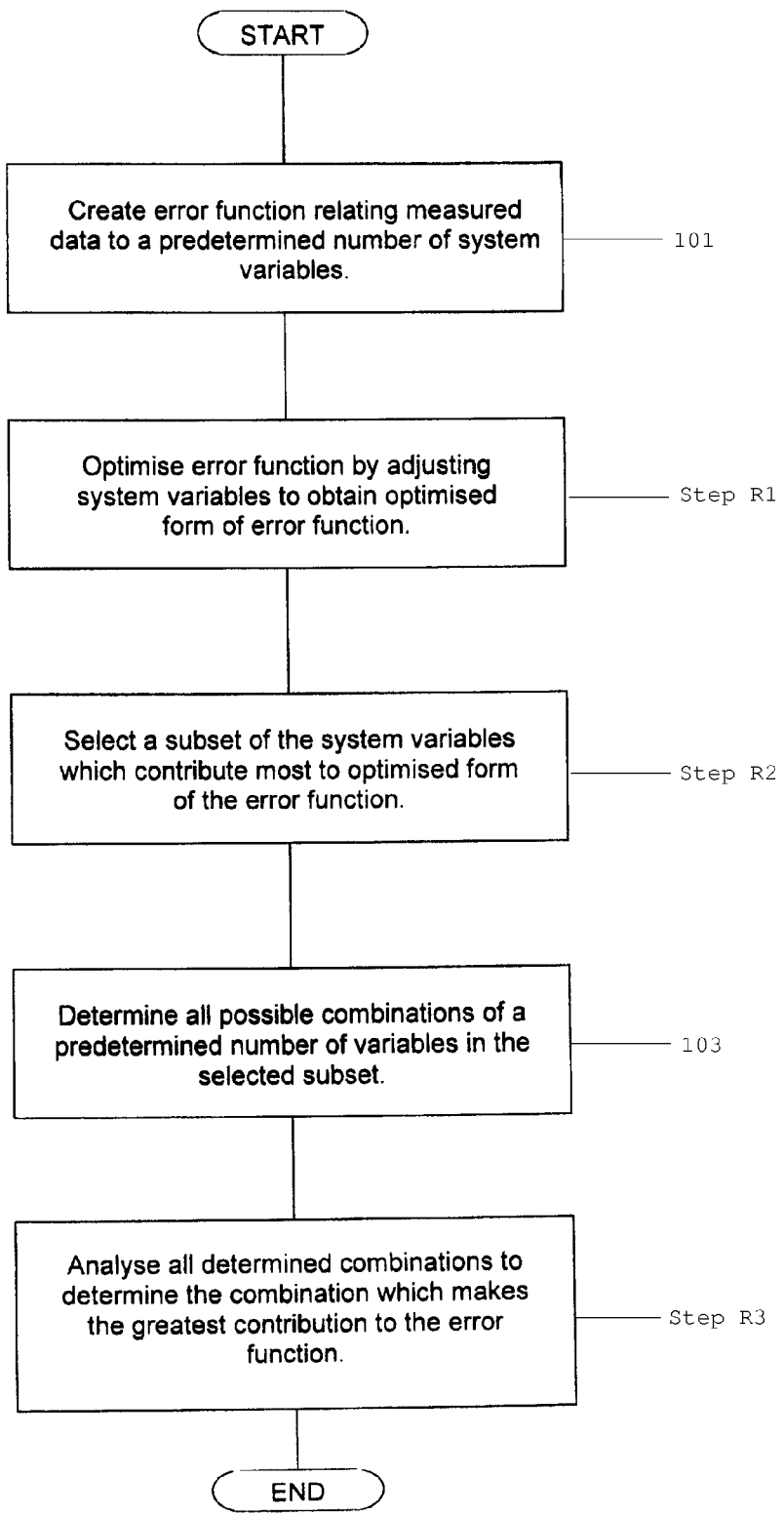
FIG. 3 diagrams a method for identifying likely contributors to an error.
Figure 4:
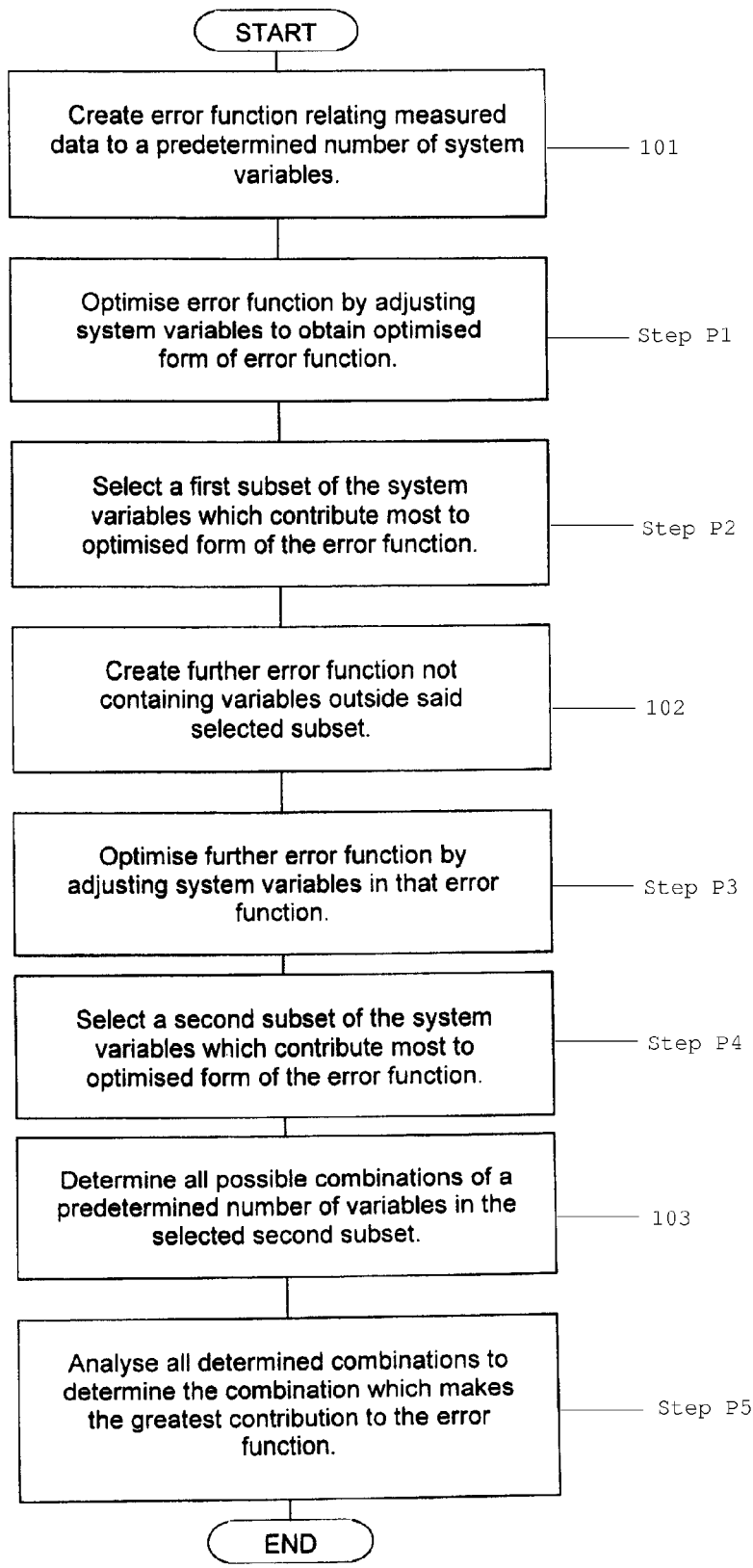
FIG. 4 diagrams another method for identifying likely contributors to an error.
Figure 5:
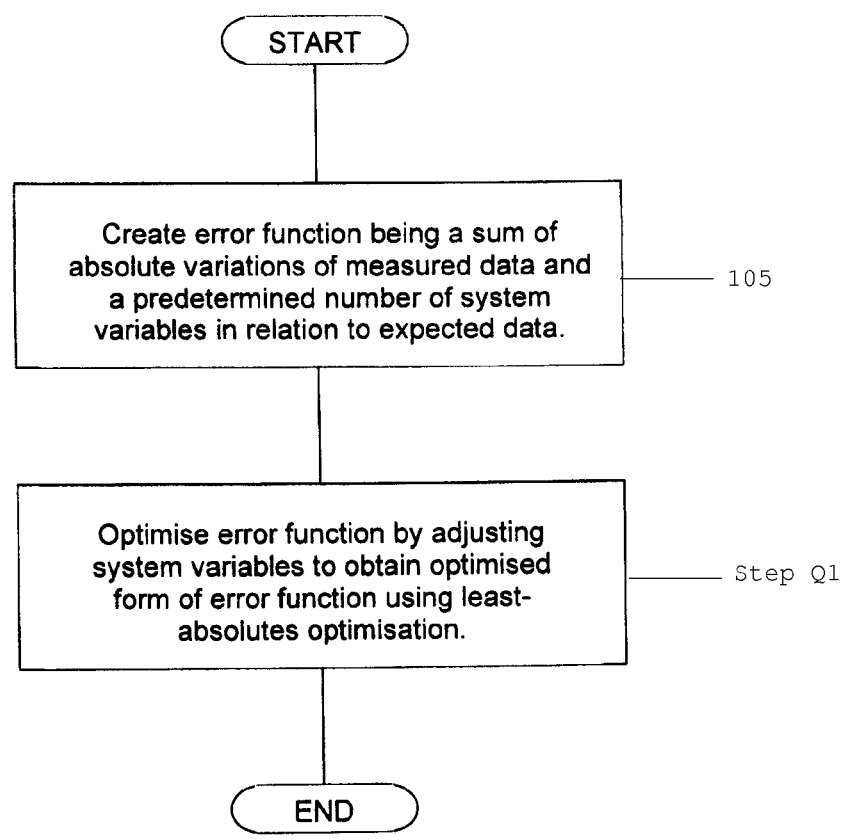
FIG. 5 diagrams a method for analyzing measured engine service or test data.

Embodiments of the present invention will now be described in relation to the accompanying FIG. 1 which shows an example of an input worksheet from which embodiments of the present invention operate.

Although some of these embodiments refer in particular to analysis of measured data from gas turbine engines, it will be understood that the invention is not limited to being applied to such data.

The embodiments below are ideally implemented using a spreadsheet program such as Microsoft Excel™. Use of a spreadsheet allows there to be a number of different worksheets containing input data, output data, plots of results, etc.

The embodiments are preferably combined in a single computer system or a single computer programming product to provide a combination of tool sets from which a user can select the appropriate method. This may allow a user, for example, to: understand a shift in production engine performance that does not correspond directly with any single parameter via exchange rates (or alternatively to illustrate the fit if a single value is responsible); examine whether there are alternative causes that could have led to the observed change in engine performance. The exchange rates may also be used to assess engine changes such as deterioration, cold stabilisation overshoot (temperature overshoot when an engine is accelerated to high power from e.g. idle, and the engine is still cold, giving rise to various thermal effects), etc.

An input worksheet is thus provided which contains the exchange rates, both synthesis and analysis, that apply at a fixed parameter (e.g. a fixed corrected thrust; a fixed engine pressure ratio (EPR); or a fixed speed). The use of analysis and synthesis exchange rates permits both engine changes and potential measurement errors to be examined. This input worksheet is also where the user enters the measured change which is the subject of the analysis. Multiple input worksheets can be provided and used in turn.

An example of an input worksheet is shown in FIG. 1. Note that this is not a full typical input worksheet since some of both the observed values and the exchange rate parameters have been deleted to reduce the sheet to a size suitable for this Figure. The shaded portion 1 contains the exchange rates applicable at the fixed parameter between the exchange rate parameters or system variables 2 and the observable or measurable parameters 3. These are coefficient values that relate the variable parameters 2 to the observable parameters 3. For example a particular row in the sheet may represent the effect of a 1% high pressure compressor (HPC) change on observed engine speeds, temperatures and pressures at a fixed thrust. In the example shown in FIG. 1, all the exchange rates are given in percentage terms, which is preferred as it allows comparison between parameters of different types on the same scales.

The "matching values" 4, i.e. the observed change in parameters for which a solution is desired are entered in a further portion of the worksheet. The weighting given to any of the variables 2 or the matching values 4 can be changed by adjusting the normalisation value 5 or 6 associated with each of them.

The input worksheet allows the user to select a subset of the variables 2 (i.e. the possible changes to the engine parameters or measurement error values) to make active for a particular analysis run using flag inputs 7. The user can also select a subset of the observed values 4 to make active using flag inputs 8.

The analysis tool sets and embodiments below all work in a similar fashion. Each change to a variable (such as an efficiency delta or a bleed leakage) is assessed via exchange rates to evaluate the corresponding change calculated for the observed parameters. The methods aim to optimise the quality of the match of the calculated parameter with those actually observed. To do this the program calculates an error function which is representative of the quality of the match and uses a mathematical process to find the minimum of this error function.

All of the embodiments below are configured to take the solutions and produce charts to illustrate the fit of a solution to the observed data and also to produce a summary of the matches found where multiple solutions are produced.

Whilst these tools and methods have particular applicability in performance modelling, they can be used in analysing any problem where a set of inputs can be linearly related to a set of outputs, where the outputs are known and it is required to infer the inputs.

A first analysis tool set is based around optimising an error function of the form:

$$\sum_{i=1}^{n} |Var(i)/VNorm(i)|^{Ef(i)} + \sum_{j=1}^{m} |(Mcal(j) - M(j))/MNorm(j)|^{Ef(j)}$$

where:

Var(i) is the value of the ith variable; VNorm(i) is the normalisation value of the ith variable (if zero this variable is excluded from the error function); Ef(i) is the error function type for the ith variable (which must take a value of 0 or 2); n is the number of variables; Mcal(j) is the matching value calculated from the exchange rates and the variable values for the jth matching quantity:

$$Mcal(j) = \sum_{i=1}^{n} Var(i) \times Xrate(i, j)$$

where Xrate(i,j) is the exchange rate in the jth matching value with respect to the ith variable; M(j) is the measured value for the jth matching parameter; MNorm(j) is the normalisation value of the jth matching value (if this is zero, this matching value is not included in the error function; and Ef(j) is the error function type for the jth matching value with the same restrictions as Ef(i).

This error function is of similar form to that used in the COMPASS system discussed above.

Embodiments of the invention in this first analysis tool set provide a number of methods that concentrate the solution to allow it to be focussed on the causes of a change when a subset of possible causes is sought, or reduce the number of possible combinations of contributory variables to be assessed in further analysis.

A first embodiment of the present invention provides a method which results in extraction of the variables or component changes making the largest contribution to the optimisation. For example, in a problem with 60 variables (a fairly common number in engine analysis situations), the user specifies a reduced number of variables, say 20, for the solution to concentrate on. The method first generates a solution using all variables, and then identifies the 20 largest contributors, and re-generates the solution using only these selected variables.

The result of this method is then applied in a searching solution where all combinations of a specified number of variables are tried in turn to try to identify an error cause.

Thus the method can confer significant advantage in further analysis, typically significantly reducing processing times and use of resources. For example, if it was desired to search all combinations of 4 variables out of a total of 60, there are 60!/(60−4)!0.4!=487,635 combinations to be tested. However, if the same searching process was applied to a set of only 20 variables, the number of combinations is reduced to 20!/(20−4)!0.4!=4,845. Solving the latter searching problem is much more viable.

Clearly the method of the first embodiment becomes of greater value in situations with a greater initial number of variables. However, the method of the first embodiment can also allow such searching solutions to be obtained for a greater number of variables in each combination.

For example, searching all possible combinations of 3 variables out of a total of 60 results in 60!/(60−3)!0.3!=34,220 combinations being tested, whilst searching all possible combinations of 5 variables out of a total of 20 results in 20!/(20−5)!0.5!=15,504 combinations being tested. Therefore, an improved result can be obtained (due to the best combination of 5 rather than of 3 variables being produced) using fewer resources (less than half the number of combinations tested).

A second embodiment of the present invention provides a method which works in a similar manner to the method of the first embodiment but involves iterative application of the "concentrator" step.

The method first generates a solution using all available variables. Then a user-specified fraction of those variables are selected, being the specified fraction which make up the greatest contribution to the solution. The solution is regenerated using only the selected variables and a further fraction of those variables are selected for the next iteration, and so on.

Thus the number of component changes and/or measurement errors is reduced with each iteration (possibly down to just one in the final iteration). The results of all iterations are displayed to the user to assist in the identification of potential causes of the measured/observed changes.

The iteration of this second embodiment may select a user-defined fraction of the variables to be retained for the next solution generation. The fraction may be fixed for all iterations. Alternatively the fraction selected may change between iterations, for example by following a predetermined pattern, or as a result of user interaction to select or set the fraction of variables to be selected at the next iteration.

There may also be a minimum absolute number by which the number of variables is reduced at each iteration (e.g. one).

The iterations may continue until a minimum number of variables are being considered, or may terminate after a predetermined number of iterations have been carried out.

Whilst this embodiment has been described with a fraction of the available variables being selected between each iteration, it will be clear that the same principles can be applied where the number of variables is reduced by an absolute number between each iteration.

The method of the second embodiment concentrates the solution prior to further analysisusing a searching method such as that described above in relation to the first embodiment.

A third embodiment of the present invention provides another method by which the solution to the optimisation of the error function can be "concentrated". The first step is, as before, to generate a solution using all available variables, with all possible variable and measurement uncertainties being included in the error function being optimised. The variable or measurement which makes the largest contribution in the solution is then assumed to be primarily responsible for the fault or measured change, and is removed from the error function for future solutions. However, it is still permitted to change in order to improve the fit of the solution. This process is then applied iteratively to eliminate a predetermined number of variables (which may be a user-defined amount or fraction, or any of the other permutations discussed in relation to the second embodiment above).

For all these embodiments, data relating to each solution is displayed to a user, preferably at each iteration, which can show the results with all variables included, and/or the results for only those variables which have been specifically excluded from the error function. This can enable or assist the user to identify a cause or causes of the performance change measured in the original data.

A second tool set is provided which is based around methods for analysing engine service data by optimising a least absolutes error function, specifically one of the form:

$$\sum_{i=1}^{n} |Var(i)/VNorm(i)|^{Ef(i)} + \sum_{j=1}^{m} |(Mcal(j) - M(j))/MNorm(j)|^{Ef(j)}$$

where:

Var(i) is the value of the ith variable; VNorm(i) is the normalisation value of the ith variable (if zero this variable is excluded from the error function); Ef(i) is the error function type for the ith variable (which must take a value of 0 or 1); n is the number of variables; Mcal(j) is the matching value calculated from the exchange rates and the variable values for the jth matching quantity:

$$Mcal(j) = \sum_{i=1}^{n} Var(i) \times Xrate(i, j)$$

where Xrate(i,j) is the exchange rate in the jth matching value with respect to the ith variable; M(j) is the measured value for the jth matching parameter; MNorm(j) is the normalisation value of the jth matching value (if this is zero, this matching value is not included in the error function; and Ef(j) is the error function type for the jth matching value with the same restrictions as Ef(i).

A fourth embodiment of the present invention provides a method for analysing engine service data which optimises a least absolutes error function. The resulting linear equation is solved using a modified simplex method. However, in alternative embodiments, other numerical methods may be used to solve the linear equation.

The method first assumes zero change in all the components, with the error function to be optimised therefore having a value equal to the measured deviation from the expected values. A cost function is then created, from which it is determined which component will give the biggest benefit towards optimising the error function. This component is then changed until it is optimised (i.e. such that the error function is at a minimum for that component alone being adjusted). At this point one of the measurements will be matched exactly as a consequence of the least absolutes process. The process then continues by finding another component and consequently matching another measurement, and this is repeated for a number of times equal to the number of measurements taken. In this process the components can be defined as the measurement error.

The solution generated may still not be optimal, for example because the above method may not have selected the best set of components due to interactions or the order in which the components were picked, or because it may be better not to match one of the measurements, e.g. due to a significant measurement error. Therefore a second stage is carried out wherein measurements and/or components can be selected in order to try to obtain a better solution. The solution converges when no further progress is possible.

By optimising a least-absolutes error function, the process has a surprising outcome in that it restricts the number of elements contributing to the error (i.e. the number of variables which have non-zero values in the solution) to the number of measurements taken. Thus what is generated by optimising an error function of this form is a solution that minimises the error by concentrating on a limited sub-set of possible measurement or component differences. Thus this method automatically provides a very effective form of "concentrator" which permits the analysis of the combined effects of component deterioration, component faults and measurement faults.

Additionally, this process has a high speed of operation, which tens of points (each point being a set of measurements for which the analysis is performed) per second being analysed on a standard personal computer.

This gives the process a speed of execution which makes previously unforeseen applications possible both in trend monitoring and in the use of the least-absolutes function. For example using this method, it is possible to monitor gradual engine changes such as component deterioration, so providing improved information for engine overhaul. It is also possible to use this method in fault diagnosis as it allows engine faults such as bleed valve failures or instrumentation drifts or faults to be quickly identified and rectified. The method can also allow engine mechanical faults that cause a performance shift to be pin-pointed, thus enabling corrective action to be taken before more serious secondary failures occur.

The method of this embodiment may equally be applied to test-bed data from an engine.

The invention claimed is:

1. A method of analysing measured data, in relation to expected data, from a system which has a plurality of associated system variables, the method including the steps of:
   a) optimizing an error function which relates the measured data to the expected data and to a predetermined number of the system variables by adjusting the system variables to obtain an optimized form of the error function;
   b) selecting a subset of the adjusted system variables which excludes one or more of the adjusted system variables which contribute most to the optimized form of the error function; and
   c) optimizing a further error function, which does not contain system variables outside the subset, by adjusting the system variables in the subset, wherein at least one of the above steps is performed by a processor.

2. A method according to claim 1 wherein steps b) and c) are performed iteratively a plurality of times.

3. A method according to claim 1, further including the step of displaying the results of one or more of the optimizing steps.

4. A method according to claim 1 wherein the error function is a sum of squares and the or each step of optimization includes a least-squares optimization.

5. A method according to claim 4 wherein the error function is of the form:

$$\sum_{i=1}^{n} |Var(i)/VNorm(i)|^{Ef(i)} + \sum_{j=1}^{m} |(Mcal(j) - M(j))/MNorm(j)|^{Ef(i)}$$

where:
Var(i) is the value of the $i^{th}$ variable;
VNorm(i) is the normalisation value of the $i^{th}$ variable (if zero this variable is excluded from the error function);
Ef(i) is the error function type for the $i^{th}$ variable (which must take a value of 0 or 2);
n is the number of variables; Mcal(j) is the matching value calculated from the exchange rates and the variable values for the $i^{th}$ matching quantity:

$$Mcal(j) = \sum_{i=1}^{n} Var(i) \times Xrate(i, j)$$

where Xrate (i, j) is the exchange rate in the $j^{th}$ matching value with respect to the $i^{th}$ variable;
M(j) is the measured value for the $j^{th}$ the matching parameter;
MNorm(j) is the normalisation value of the $j^{th}$ matching value (if this is zero, this matching value is not included in the error function; and
Ef(j) is the error function type for the $j^{th}$ matching value with the same restrictions as Ef(i).

6. A method according to claim 1, further including the step of measuring the system, or an output from the system, to obtain the measured data.

7. A method according to claim 1 wherein the measured data is data from a steady state system.

8. A method according to claim 1 wherein the system is an engine.

9. A method according to claim 8 wherein the engine is a gas turbine engine.

10. A method according to claim 8 wherein the system variables include performance parameters of the engine.

11. A method according to claim 1 wherein the system variables include measurement errors.

12. A method of identifying likely contributors to an error caused in measured data from a system which has a plurality of associated system variables, the method including the steps of:
   a) optimizing an error function which relates the measured data to expected data and to a predetermined number of the system variables by adjusting the system variables to obtain an optimized form of the error function;
   b) selecting a subset of the adjusted system variables which contains the adjusted system variables which contribute most to the optimized form of the error function; and
   c) analysing all possible combinations of a predetermined number of the variables of the subset, to determine the combination which makes the greatest contribution to the optimized error function, wherein at least one of the above steps is performed by a processor.

13. A method of identifying likely contributors to an error caused in measured data from a system which has a plurality of associated system variables, the method including the steps of:
   a) optimizing an error function which relates the measured data to expected data and to a predetermined number of the system variables by adjusting the system variables to obtain an optimized form of the error function;

b) selecting a first subset of the adjusted system variables which contains a plurality of the adjusted system variables which contribute most to the optimized form of the error function;

c) optimizing a further error function, which does not contain system variables outside the subset, by adjusting the system variables in the first subset;

d) selecting a second subset of the adjusted system variables which contains the system variables which contribute most to the optimized form of the further error function; and e) analysing all possible combinations of a predetermined number of the system variables of the second subset, to determine the combination which makes the greatest contribution to the optimized form of the further error function, wherein at least one of the above steps is performed by a processor.

14. A method according to claim 13 wherein steps b) and c) are repeated prior to selecting the adjusted system variables in step d).

15. A method of analysing measured engine service or test data, in relation to expected data, from an engine having a plurality of associated system variables, the method including:

a step of optimizing an error function which relates the measured engine service or test data to the expected data and to a predetermined number of the system variables by adjusting the system variables, wherein the error function is a sum of absolute variations of the measured engine service or test data and the system variables, and the step of optimizing includes a least-absolutes optimization of the error function, wherein at least one of the steps above is performed by a processor.

16. A method according to claim 15 wherein the error function is of the form:

$$\sum_{i=1}^{n} |Var(i)/VNorm(i)|^{Ef(i)} + \sum_{j=1}^{m} |(Mcal(j) - M(j))/MNorm(j)|^{Ef(i)}$$

where:

Var(i) is the value of the $i^{th}$ variable;

VNorm(i) is the normalisation value of the $i^{th}$ variable (if zero this variable is excluded from the error function);

Ef(i) is the error function type for the $i^{th}$ variable (which must take a value of 0 or 1);

n is the number of variables;

Mcal(j) is the matching value calculated from the exchange rates and the variable values for the $j^{th}$ matching quantity:

$$Mcal(j) = \sum_{i=1}^{n} Var(i) \times Xrate(i, j)$$

where Xrate (i, j) is the exchange rate in the $j^{th}$ matching value with respect to the $i^{th}$ variable;

M(j) is the measured value for $j^{th}$ the matching parameter;

MNorm(j) is the normalisation value of the $j^{th}$ matching value (if this is zero, this matching value is not included in the error function); and Ef(j) is the error function type for the $j^{th}$ matching value with the same restrictions as Ef(i).

17. A method according to claim 15 wherein the step of optimizing includes the sub-steps of:

a) determining the system variable whose variation contributes most to optimizing the error function;

b) optimizing the error function by adjusting only that system variable;

c) removing the adjusted system variable from the error function; and d) repeating steps a) to c) for further system variables until no further optimization is possible.

18. A method according to claim 15 further including the step of measuring the engine service or test data from the engine, or from an output from the engine, to obtain the measured engine service or test data.

* * * * *